June 27, 1961  E. S. GANDRUD  2,990,186
DEVICE FOR SPREADING GRANULAR MATERIAL
Filed Sept. 11, 1959  2 Sheets-Sheet 1
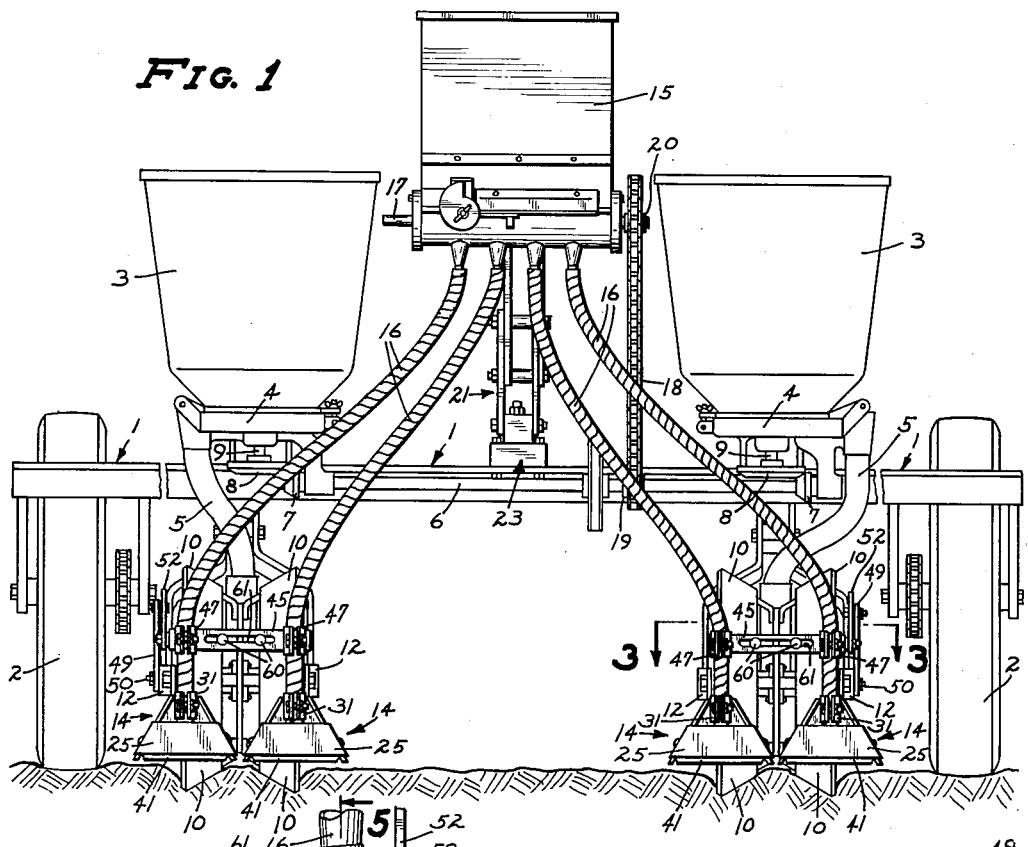
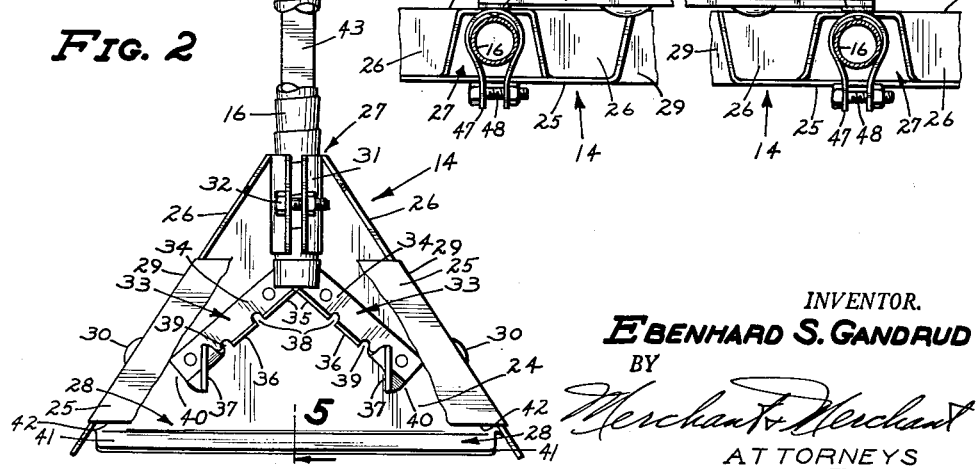
INVENTOR.
EBENHARD S. GANDRUD
BY
Merchant & Merchant
ATTORNEYS

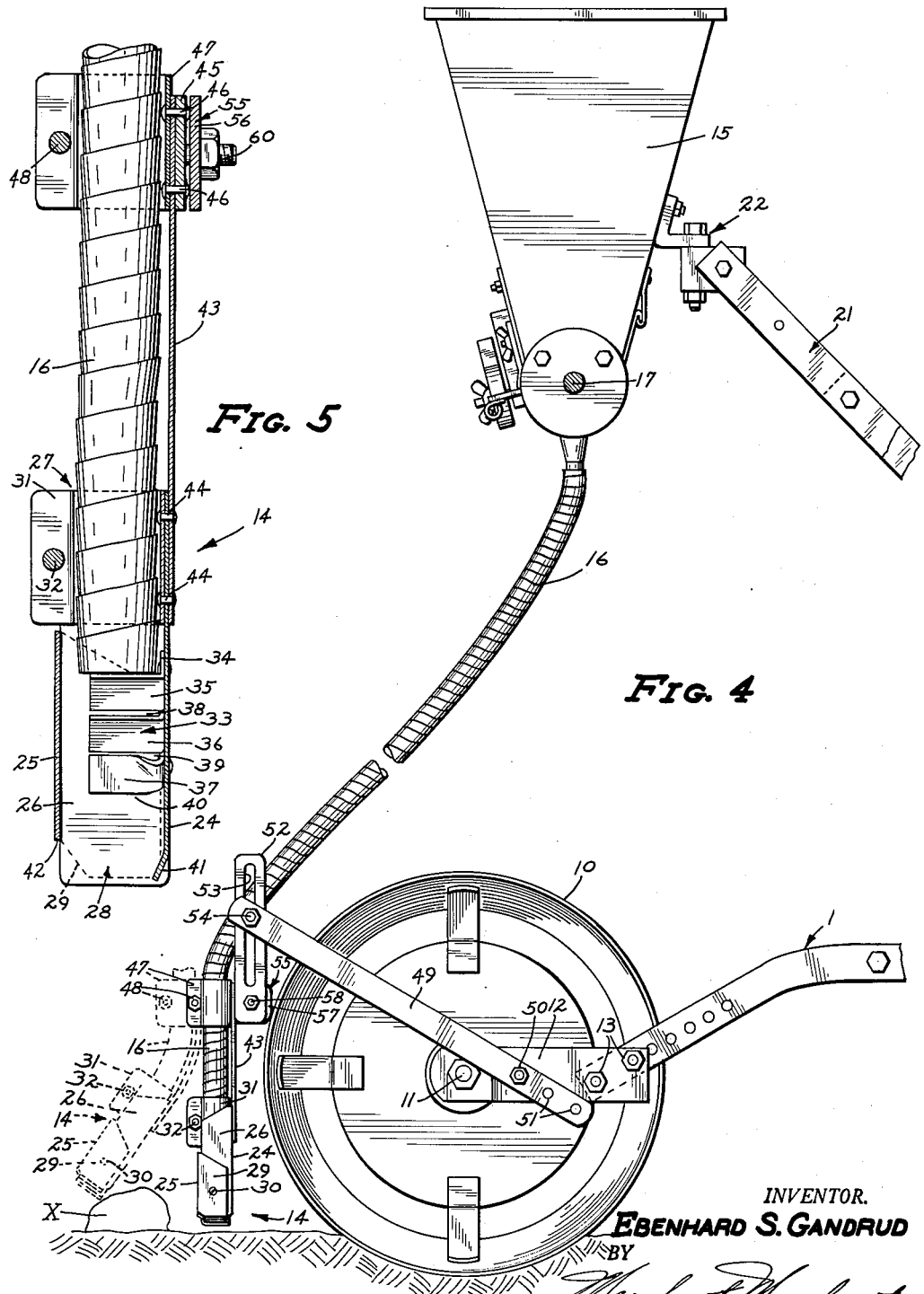

United States Patent Office 2,990,186
Patented June 27, 1961

2,990,186
DEVICE FOR SPREADING GRANULAR MATERIAL
Ebenhard S. Gandrud, Owatonna, Minn.
Filed Sept. 11, 1959, Ser. No. 839,413
11 Claims. (Cl. 275—14)

My invention relates generally to devices for spreading granular material over the ground, and more particularly to such devices utilized in connection with agricultural implements for the purpose of distributing granular herbicides, insecticides, fertilizer, and the like, over the ground on or adjacent rows of planted seed in a field.

It has been found, that when planting row crops, by properly applying herbicide in granular form to the ground over and adjacent the planted seeds, weeds are destroyed before or as they appear, whereby growth of the crops is unhindered and cultivation thereof made easier, resulting in a greatly improved yield.

An important object of my invention is the provision of a novel distributor head and novel means for mounting the same on a mobile agricultural implement, such as a seed planter or the like, said means including a flexible resilient member which normally holds the head in a generally vertical position, and which will yield in directions forwardly and rearwardly to permit the head to ride over obstructions in the path of travel of the head.

Another object of my invention is the provision of a distributor head as set forth, and novel mounting means therefor whereby the head may be quickly and easily attached to any one of a wide variety of agricultural implements in a manner to spread granular material over the ground with a uniform distribution over the entire area covered by the head.

Still another object of my invention is the provision of a distributor head of the above type having baffle structure therein defining an apex, and novel means for attachment to a flexible feeding tube for delivery of granular material to the distributor head, whereby said material is discharged evenly to the baffle structure at opposite sides of said apex.

A still further object of my invention is the provision of a distributor head as set forth, having baffle structure including baffle sections which may be quickly and easily adjusted to control the pattern of discharge of granular material from the distributor head.

Another object of my invention is the provision of a distributor head having generally vertically disposed front and rear walls and downwardly diverging side walls, and defining an inlet opening in its upper end and an open bottom for discharge of material therefrom, and baffle structure in said head between the inlet opening and the open bottom and including a plurality of baffle sections, wherein one of said generally vertical walls may be quickly and easily removed for easy access to the baffle sections for adjustment and cleaning thereof.

Another object of my invention is the provision of a device for spreading granular material, as set forth, which is simple and inexpensive to produce, which is highly efficient in operation and which is rugged in construction and durable in use.

The above, and further highly important objects and advantages of my invention will become apparent from the following detailed specification, appended claims, and attached drawings.

Referring to the drawings, which illustrate the invention, and in which like reference characters indicate like parts throughout the several views:

FIG. 1 is a view in rear elevation of a conventional seed planting implement showing my novel spreading device mounted thereon, some parts being broken away, the seed planting device shown somewhat diagrammatically;

FIG. 2 is an enlarged fragmentary view in rear elevation of one of the distributor heads of FIG. 1, some parts being broken away;

FIG. 3 is an enlarged fragmentary section taken on the line 3—3 of FIG. 1;

FIG. 4 is an enlarged fragmentary view in side elevation, as seen from the right with respect to FIG. 1, some parts being broken away and some parts being shown in section; and FIG. 5 is an enlarged fragmentary section taken substantially on the line 5—5 of FIG. 2.

As above indicated, my novel spreading device is particularly adapted for use with agricultural implements, particularly with listers or seed planters commonly used for planting seed in spaced rows thereof. Such a planter is shown fragmentarily in FIGS. 1 and 4, and usually involves a frame structure 1 supported by wheels 2 for movement over the ground when drawn by a tractor or the like, not shown. The planting machine shown is of the commercially available type utilized to plant two rows at a time and including, conventional seed planting mechanism not shown, a pair of fertilizer dispensing hoppers 3, feeding mechanism contained within a pair of housings 4 at the bottoms of the hoppers 3, and conduits 5 which deliver fertilizer from the hoppers 3 to the ground. The fertilizer dispensing mechanisms, not shown, within the housings 4 are suitably driven from a power driven rotary shaft 6, through the medium of bevel gears 7 and 8, the former of which are mounted fast on the rotary shaft 6, and the latter of which are mounted on shafts 9 which may be assumed to be operatively connected to the seed dispensing mechanism, not shown. Planters of the type herein shown usually include means for opening furrows in the ground, and other means such as pairs of cooperating planter wheels or the like 10 for covering the seed and fertilizer, the conduits 5 discharging the fertilizer to the furrow in front of the planter wheels 10. As shown in FIGS. 1 and 4, the planter wheels 10 are usually journalled on shafts 11 mounted between bracket members or the like 12 that are rigidly secured to the frame structure 1 by nut equipped bolts 13. The above described planter is conventional in nature, and in and of itself does not comprise the instant invention. Hence, for the sake of brevity, further detailed showing and description thereof is omitted.

My present invention is particularly adapted for use in applying granular material to the ground over and adjacent the rows of planted seed to destroy noxious weeds, or at least to discourage or stunt the growth thereof, and comprises one or more distributor heads 14 adapted to be disposed rearwardly of the planting wheels 10. In the arrangement shown in FIG. 1, a pair of distributor heads 14, in side by side relationship, is disposed behind each cooperating pair of planter wheels 10. Granular herbicide or the like is dispensed to each of the heads 14 from a dispensing hopper 15 through flexible feeding tubes 16. The dispensing hopper 15 is preferably of the type fully disclosed in my prior United States Letters Patent 2,852,166, and involves a rotary feeding agitator, not shown, but which is mounted on a rotary shaft 17. The shaft 17 is adapted to be driven from the rotary shaft 6 by an endless link chain 18 entrained over a driving sprocket 19 on the shaft 6 and a second sprocket wheel 20 on the agitator shaft 17. The dispensing hopper 15 is adapted to be mounted in a suitable location on the frame structure 1 by means of a longitudinally adjustable mounting arm 21 that is operatively connected at its upper end to the hopper 15, as indicated generally at 22 in FIG. 4, and which is operatively connected at its lower end to the frame structure 1, as indicated generally at 23 in FIG. 1. The connections indicated at 22 and at 23, together with the arm 21, permit the hopper 15 to be rigidly supported in the most advantageous position on the frame structure 1 for proper feeding of granular material therefrom to the distributor heads 14.

The several distributor heads 14 are identical in construction, and description of any one thereof will apply equally to the others thereof. Each distributor head 14 comprises generally vertically disposed front and rear walls 24 and 25, respectively, in spaced parallel relationship, and downwardly diverging side walls 26, the several walls defining an inlet opening 27 at the upper end of each head 14, and an open bottom 28. The rear wall 25 is formed to provide side flanges 29 which overlie adjacent portions of the downwardly diverging side walls 26, and which are locked in engagement with said side walls 26 by screws or the like 30 extending through suitable apertures in the flanges 29 and screw threaded into the adjacent side walls 26. A clamping device 31 is riveted to the upper end of the front wall 24, within the inlet opening 27, and receives the lower end portion of a respective feeding tube 16, said end portion of the tube 16 being anchored in place by means of a nut equipped clamping screw 32.

Contained within each distributor head 14 there is a baffle structure 33 comprising mounting flanges 34 that are riveted or otherwise rigidly secured to the front wall 24, and pairs of inner, intermediate, and outer baffle sections 35, 36, and 37, respectively, which baffle sections extend rearwardly toward the rear wall 25 and terminate in forwardly spaced relation thereto, see FIG. 5. The inner baffle sections 35 are disposed in downwardly diverging relationship and cooperate to define an apex which intersects the axis of the inlet opening 27 and the discharge end of the feeding tube 16, the baffle sections 35 extending rearwardly at least to sufficiently underlie the entire diameter of the discharge end of the feeding tube 16, see FIG. 5. The intermediate baffle sections 36 are disposed in coplanar relationship with their adjacent inner baffle sections 25, and cooperate therewith to define slotlike openings 38 for passage of granular material therethrough. The outer baffle sections 37, as is shown particularly in FIG. 2, are twisted out of coplanar relationship with their adjacent baffle sections 36, and cooperate therewith to define openings 39 of greater width than the openings 38. The outer baffle sections 37 are inwardly spaced from their adjacent side walls 26 and cooperate therewith to define openings or passageways 40 of greater width than the passageways or openings 39. Preferably, the baffle structure is constructed of sheet metal, the baffle sections 37 being capable of being twisted with the aid of a pair of pliers or the like, to regulate the evenness or uniformity of distribution of the granular material being fed therethrough. This can be quickly and easily accomplished by removal of the screws 30 and displacement of the rear wall 25. Moreover, should particles of granular material adhere to the baffle structure, the baffle structure as well as the interior of the heads 14 may be quickly and easily cleaned, simply by removing the back walls 25 thereof. With reference to FIG. 5, it will be seen that the lower edge of the front wall 24 is bent to form a rearwardly and downwardly sloping flange 41. Inasmuch as the heads 14 are made from relatively light weight sheet metal, said flanges 41 serve to impart rigidity to the lower end portions thereof. It will further be noted, particularly with reference to FIGS. 2 and 5, that the bottom edge of the rear walls 25, indicated at 42, terminate in upwardly spaced relation to the lower or bottom edges of their respective from walls 24, for a purpose which hereinafter will be described.

The several distributor heads 14 are adapted to be mounted on the frame structure 1 by novel mounting means now to be described. Extending upwardly from each distributor head 14 is an elongated flat leaf spring 43 that is riveted or otherwise rigidly secured at its lower end to the front wall 24 of its respective head 14, preferably by the same rivets which anchor the clamping device 31 thereto, said rivets being indicated at 44. At their upper ends, the leaf springs 43 of each pair thereof are rigidly secured to opposite ends of a horizontally disposed conenctor bar 45, by means of rivets or the like 46. These rivets 46 also anchor to the upper ends of the leaf springs 43 tube clamping devices 47 similar to the clamping devices 31 and provided with nut equipped clamping screws 48. It will be noted that the planes of the front and rear walls 24 and 25 of the distributor heads 14 are disposed transversely of the direction of travel of the seed planter, and that the connector bar 45 and leaf springs 43 lie in planes parallel to the planes of the front and rear walls 24 and 25 respectively. The clamping devices 47 being upwardly spaced each from one of the clamping devices 31, a portion of the feeding tube 16 therebetween is supported in a vertical position, so that granular material being fed to each distributor head 14 falls vertically downwardly toward the underlying baffle structure 33. With this arrangement, the granular material is distributed evenly at opposite sides of the apex defined by the adjacent edges of the inner baffle sections 35. To further insure even distribution to opposite sides of said apex, the extreme lower end of each feeding tube 16 rests upon the inner edges of the inner baffle sections 35 defining such apex, see FIGS. 2 and 5.

The mounting means for each pair of distributor heads 14 further includes a rigid primary mouting bar 49, which is rigidly secured to an adjacent bracket member 12 by means of a nut equipped bolt 50 extending through a suitable aperture in the bracket member 12 and through one of a plurality of longitudinally spaced mounting apertures 51 at one end portion of the arm 49, see FIG. 4. The primary mounting bars 49 preferably extend upwardly and rearwardly, each thereof adjustably connected at its upper rear end portion to a secondary mounting bar 52. The bars 52 each have longitudinally extending slots 53 therein, for slidable reception of nut equipped clamping bolts 54 which extend therethrough and through suitable apertures in the upper rear end portions of the primary mounting bars 49, so that pivotal and longitudinal adjustment may be had between the primary and secondary bars. An angular bar 55 comprises relatively long and relatively short angularly disposed arms 56 and 57 respectively, the short arm 57 thereof being pivotally secured to one end portion of the secondary bar 52, by a nut and bolt connection 58 which permits angular adjustment between each secondary bar 52 and its respective angle bar 55. A toothed lock washer 59 interposed between each bar 52 and short arm 57 aids in preventing angular movement between each bar 52 and its respective angular bar 55 when the clamping bolt 58 thereof is tightened. The long arm 56 of each angular bar 55 extends in the direction of an adjacent connector bar 45 and is clamped in face to face relationship therewith by a pair of longitudinally spaced nut equipped clamping bolts 60 that extend through aligned longitudinally extended slots 61 and 62 in the connector bar 45 and long arm 56 respectively. With this arrangement, each pair of heads 14, may be adjusted transversely of the direction of travel thereof, other adjustments being had between the several members comprising the distributor head mounting means, so that the heads 14 are easily mounted on planting machines or listers of various makes.

In use, the heads 14 are mounted behind each planting wheel 10 in positions wherein the front and rear walls 24 and 25 of the heads 14 are generally vertically disposed, with the bottom edges of the front walls substantially level with, or just above, the ground. As the planter moves over the prepared field during the planting operation, granular herbicide or other material is fed from the hopper 15 through the various tubes 16. The material, as it passes downwardly through the generally vertically disposed portions of the feeding tubes 16 between the clamping devices 47 and 31, is evenly distributed over the cross-sectional area of the discharge end portion of the feeding tubes 16, and an equal amount of the granular material is delivered to the baffle structure 33 at opposite sides of the apex defined by the inner baffle sections 35. As the granules discharged from the flexible feeding tubes 16 impinge upon the upper surfaces of the inner baffle sections 35, the granules rebound upwardly and outwardly toward the side walls 26, whereby some of the granules will be caused to drop through the openings 38, some through the openings 39, other granules being tossed laterally outwardly to a point where they drop through the openings 40. Further, a substantial percentage of the granules rebounds from the baffle sections toward the rear walls 25, these granules dropping downwardly in the space between the rear ends of the several baffle sections and the rear walls 25, to the ground. I have found, that by imparting a slight twist to the outer baffle sections 37 in either direction from the positions thereof shown in FIG. 2, the flow pattern of the granular material can be very accurately controlled. Usually, once the baffle elements 37 have been adjusted to provide a uniform pattern of granular material over the entire area of the open bottom of a given head 14, no further adjustment is necessary, unless the operator desires other than a uniform flow pattern.

As the machine travels forwardly over a field, the upward spacing of the lower edge of the rear walls 25 from the lower edges of their respective front walls 24 prevents the lower edges of the rear walls 25 from engaging the underlying earth which might otherwise be scooped into the heads and interfere with proper uniform distribution of the granular material.

The leaf springs 43 perform an important function during their support of the distributor heads 14. The leaf springs 43 yield sufficiently in directions parallel to the direction of movement of the machine to permit the heads 14 to swing rearwardly and upwardly in the event that an obstruction, such as a stone in the field, is encountered by a head 14. Such a stone or like obstruction is shown in FIG. 4, and indicated by reference character X, upward and relatively rearward swinging movement of the adjacent head 14 being shown by dotted lines in FIG. 4. As the head 14 rides over the obstruction X, and away therefrom, the resilience of the leaf spring 43 causes the head 14 to again assume its generally vertical position. The feeding tubes 16 are preferably made from flexible resilient metallic ribbon formed into loosely overlapping convolutions which do not collapse when the tube 16 is caused to bend, such as shown in FIG. 4. Thus the flow of granular material is maintained through the head 14 even when the same travels over the obstruction X.

The convolutions of the metallic ribbon forming the tubes 16 are capable of generally telescopic movement relative to each other. Hence, the tubes 16 can be longitudinally contracted or expanded. This characteristic of the tubes 16 enables the leaf springs 43 to be offset forwardly of the lower end portions of the tubes, and said lower end portions exert but a minmum of resistance to flexing of the leaf springs 43.

It will be appreciated that, while I have shown a pair of heads 14 behind each cooperating pair of planter wheels 10, but one thereof behind each pair of planter wheels may be used, if desired. For instance, in using the instant device for weed control on sugar beets and vegetable crops, it is only necessary that a single distributor head 14 be used to distribute the granular herbicide. On the other hand, for crops such as corn, it is advisable that two of the heads 14 be used in side by side arrangement, as shown in FIG. 1, to provide for a wider coverage on each row.

My invention has been thoroughly tested and found to be completely satisfactory for the accomplishment of the objectives set forth; and while I have shown and described a commercial embodiment of my novel device for spreading granular material, it will be understood that the same is capable of modification, and that modification may be made without departure from the spirit and scope of the invention, as defined in the claims.

What I claim is:

1. In a device for spreading granular material, a generally vertically disposed distributor head comprising opposed generally vertical front and rear walls and downwardly diverging side walls and having an inlet opening at its upper end and an enlarged open bottom for discharge of material therefrom, baffle means in said distributor head between the inlet opening and said open bottom for guiding granular material from said inlet opening in directions to provide uniform discharge of said material throughout the area of said open bottom, said baffle means including a pair of downwardly diverging plate-like baffle sections defining an apex on the axis of said inlet opening, a flexible feeding tube extending axially downwardly through said inlet opening and terminating substantially at said apex, said baffle sections being secured to one of said generally vertical walls and extending toward the opposite wall a distance at least sufficient to underlie the entire discharge end of said feeding tube, and means for mounting said distributor head on a mobile implement and including a flexible resilient member yieldingly maintaining said head in its said generally vertical position but permitting angular movement of said distributor head in a direction rearwardly away from said generally vertical position, whereby said distributor head will be deflected by obstructions in the path of travel of said distributor head.

2. In a device for spreading granular material, a generally vertically disposed distributor head comprising opposed generally vertical front and rear walls and downwardly diverging side walls and having an inlet opening at its upper end and an enlarged open bottom for discharge of material therefrom, baffle means in said distributor head between said inlet opening and said open bottom for guiding granular material from said inlet opening in directions to provide uniform discharge of said material throughout the area of said open bottom, a clamping device mounted on one of said walls adjacent said inlet opening for attachment to the discharge end portion of a delivery conduit and disposed to direct said discharge end toward the central portion of said baffle means, and means for mounting said distributor head on a mobile implement and including a flexible resilient member yieldingly maintaining said head in its said generally vertical position but permitting angular movement of said distributor head in a direction rearwardly away from said generally vertical position, whereby said distributor head will be deflected by obstructions in the path of travel of said distributor head.

3. In a device for spreading granular material, a generally vertically disposed distributor head comprising opposed generally vertical front and rear walls and downwardly diverging side walls and having an inlet opening at its upper end and an enlarged open bottom for discharge of material therefrom, baffle means in said distributor head between said inlet opening and said open bottom for guiding granular material from said inlet opening in directions to provide uniform discharge of material throughout the area of said open bottom, and means for mounting said distributor head on a mobile implement and including a spring extending upwardly from one of said generally vertical walls and suspending said distributor head, said spring yieldingly maintaining said head in its generally vertical position but permitting angular forward and rearward movement of said head, whereby said distributor head will be deflected by obstructions in the path of travel of said distributor head.

4. In a device for spreading granular material, a generally vertically disposed distributor head comprising opposed generally vertical front and rear walls and downwardly diverging side walls and having an inlet opening at its upper end and an enlarged open bottom for discharge of material therefrom, baffle means in said distributor head between said inlet opening and said open bottom for guiding granular material from said inlet opening in directions to provide uniform discharge of material throughout the area of said open bottom, and means for mounting said distributor head on a mobile implement, said means including, a leaf spring extending upwardly from one of said generally vertical walls and suspending said distributor head, said spring yieldingly maintaining said head in its generally vertical position but permitting angular forward and rearward movement of said head, whereby said distributor head will be deflected by obstructions in the path of travel of said distributor head, a primary mounting bar having a mounting aperture at one end for rigid connection to said mobile implement, a secondary bar adjustably pivotally mounted on the opposite end of said primary bar on a horizontal axis, and means operatively connecting the upper end of said leaf spring to said secondary bar for adjustable pivotal movement on an axis parallel to the axis of pivotal mounting of said secondary bar to said primary bar.

5. The structure defined in claim 4 in which said last mentioned means comprises an angular bar having arms normal to each other, one of said arms being pivotally connected to said secondary bar, the other of said arms being generally horizontally disposed and extending transversely of the direction of movement of said device, the upper end of said spring being operatively connected to said transversely extending arm for adjustment longitudinally of said transversely extending arm.

6. In a device for spreading granular material, a generally vertically disposed distributor head comprising opposed generally vertical front and rear walls and downwardly diverging side walls and having an inlet opening at its upper end and an enlarged open bottom for discharge of material therefrom, baffle means in said head including a pair of downwardly diverging baffle sections underlying said inlet opening and defining an apex on the axis of said inlet opening, a flexible feeding tube extending axially downwardly through said inlet opening and terminating at its lower discharge end substantially at said apex, means for mounting said distributor head on a mobile implement and including a vertically disposed spring extending upwardly from one of said generally vertical walls, said spring being rigid in directions parallel to the planes of said front and rear walls but resilient in opposite directions normal to said planes whereby said head may move forwardly and rearwardly relative to an implement on which said head is mounted, a clamping device mounted on one of said walls rigidly supporting the discharge end portion of said flexible feeding tube, and a second clamping element rigidly connecting said feeding tube to the upper end portion of said spring to normally maintain said tube therebetween and said inlet opening in a vertical position, said spring permitting said distributor head to be deflected by obstructions in the path of travel thereof.

7. In a device for spreading granular material, a pair of generally vertically disposed distributor heads in closely spaced side by side relationship, each of said heads comprising opposed generally vertical front and rear walls and downwardly diverging side walls and having an inlet opening in its upper end and an enlarged open bottom for discharge of material therefrom, baffle means in said distributor heads between the inlet openings and open bottoms thereof for guiding granular material from said inlet openings in directions to provide uniform discharge of said material throughout the areas defined by said open bottoms, and means for mounting said heads in side by side relationship on a mobile implement, said last mentioned means comprising a horizontally disposed connector bar extending in a plane parallel to the planes of said front and rear walls, a pair of vertically disposed springs connected at their lower ends each to one of said distributor heads and at their upper ends to opposite end portions of said connector bar, a primary mounting bar having a mounting aperture at one end for rigid connection to said implement, a secondary bar adjustably mounted on the opposite end of said primary bar for combined pivotal and sliding movements longitudinally of said second bar, means releasably locking said secondary bar against said movements, an angular bar having arms normal to each other, one of said arms being pivotally connected to said secondary bar, the other of said arms being generally horizontally disposed and extending transversely of the direction of movement of said implement, and means mounting said connector bar to said other of said arms in parallel relation thereto and for movements longitudinally thereof and for releasably locking said connector bar against said movements, said springs being relatively rigid against movements in directions parallel to the planes of said front and rear walls but resilient in opposite directions normal to said planes.

8. The structure defined in claim 7 in further combination with a feeding hopper, independent means for mounting said feeding hopper on said implement at a higher level than said distributor heads, a pair of independent flexible feeding tubes connected at their upper ends to said hopper, and means connecting the lower ends of said tubes each to a different one of said heads and disposing the lower discharge ends of said tubes in overlying relation to the central portions of said baffle means in said heads.

9. The structure defined in claim 8 in which said last mentioned means comprises a pair of tube clamping devices each mounted adjacent the inlet opening of a different one of said distributor heads, and in further combination with a second pair of tube clamping devices one each rigidly secured to an opposite end portion of said connector bar, said tube clamping devices cooperating to yieldably hold the lower end portions of their respective feeding tubes in vertical positions.

10. In a device for spreading granular material, a generally vertically disposed distributor head comprising opposed generally vertical front and rear walls and downwardly diverging side walls and having an inlet opening at its upper end and an enlarged open bottom for discharge of material therefrom, baffle means in said distributor head between the inlet opening and said open bottom for guiding granular material from said inlet opening in directions to provide uniform discharge of said material throughout the area of said open bottom, said baffle means comprising, a pair of inner baffle sections underlying said inlet opening and diverging downwardly from the axis of said inlet opening, intermediate baffle sections coplanar with adjacent inner baffle sections and laterally outwardly spaced therefrom, and a pair of outer baffle sections each disposed in laterally outwardly spaced relation to an adjacent one of said intermediate baffle sections and each angularly disposed with respect to the plane of its adjacent intermediate section and inwardly spaced from an adjacent one of said side walls, and means for mounting said distributor head on a mobile implement and including a flexible resilient member yieldingly maintaining said head in its said generally vertical position but permitting angular movement of said distributor head in a direction rearwardly away from said generally vertical position, whereby said distributor head will be deflected by obstructions in the path of travel of said distributor head.

11. In a device for spreading granular material, a generally vertically disposed distributor head comprising opposed generally vertical front and rear walls and downwardly diverging side walls and having an inlet opening at its upper end and an enlarged open bottom for discharge of material therefrom, baffle means in said distributor head between said inlet opening and said open bottom for guiding granular material from said inlet opening in directions to provide uniform discharge of said material throughout the area of said open bottom, a flexible feeding tube extending axially downwardly through said inlet opening and terminating at its lower discharge end within said distributor head, means for mounting said distributor head on a mobile implement and including a vertically disposed leaf spring extending upwardly from one of said generally vertical walls, said leaf spring being rigid in directions parallel to the planes of said front and rear walls but resilient in opposite directions normal to said planes whereby said head may move forwardly and rearwardly relative to an implement on which said head is mounted, means for rigidly connecting the discharge end portion of said feeding tube to said distributor head, and means rigidly connecting said feeding tube to the upper end portion of said leaf spring to normally maintain said tube therebetween and said inlet opening in a vertical position, said spring permitting said distributor head to be deflected by obstructions in the path of travel thereof.

References Cited in the file of this patent

UNITED STATES PATENTS 1,695,165     Wilberg _____ Dec. 11, 1928

FOREIGN PATENTS 1,128,368     France _____ Aug. 20, 1956